United States Patent [19]

Mabey et al.

[11] Patent Number: 4,975,952
[45] Date of Patent: Dec. 4, 1990

[54] METHOD OF DATA COMMUNICATION

[75] Inventors: Peter J. Mabey, Comberton; Roman Mervart, Impington, both of England

[73] Assignee: U. S. Philips Corporation, New York, N.Y.

[21] Appl. No.: 192,815

[22] Filed: May 11, 1988

Related U.S. Application Data

[63] Continuation of Ser. No. 904,073, Sep. 4, 1986, abandoned.

[30] Foreign Application Priority Data

Sep. 4, 1985 [GB] United Kingdom ................. 8522000

[51] Int. Cl.$^5$ ............................................. H04K 1/00
[52] U.S. Cl. .......................................... 380/49; 380/25; 340/825.31; 340/825.34; 370/60; 370/94.1
[58] Field of Search .................. 364/200, 900; 370/60, 370/94.1; 340/825.31, 825.34; 380/20, 48, 50, 49, 95, 23–25; 371/32, 34, 49

[56] References Cited

U.S. PATENT DOCUMENTS

| | | | |
|---|---|---|---|
| 3,528,057 | 9/1970 | van Duuren et al. | 371/32 |
| 3,876,979 | 4/1975 | Winn et al. | 371/32 |
| 4,092,630 | 5/1978 | van Duuren et al. | 371/32 |
| 4,322,576 | 3/1982 | Miller | 380/48 X |
| 4,636,851 | 1/1987 | Drury et al. | 380/20 X |
| 4,661,657 | 4/1987 | Grenzebach et al. | 380/48 X |
| 4,694,489 | 9/1987 | Frederiksen | 380/20 X |
| 4,700,388 | 10/1987 | Okada et al. | 380/20 |
| 4,757,536 | 7/1988 | Szczutkowski et al. | 380/48 |

FOREIGN PATENT DOCUMENTS 0089831 9/1983 European Pat. Off. .
2522166 11/1976 Fed. Rep. of Germany .

OTHER PUBLICATIONS

"High Speed Data Transfer Over Satellites"; by J. L. Owings; *Compcon 83 Proceedings*, pp. 66–70; 1983.
English Abstract of Japanese Patent Application 55-137743; (vol. 5, No. 7; 1/17/81).
*IBM Tech. Discl. Bull.*, (vol. 24, No. 11B; 4/82); pp. 5805–5808.
E.P.O. Search Report EP8620149z, dated 12/28/88.

*Primary Examiner*—Stephen C. Buczinski
*Assistant Examiner*—Bernarr Earl Gregory
*Attorney, Agent, or Firm*—Leroy Eason

[57] ABSTRACT

A method of data communication, particularly for long data messages, is disclosed. The data code words of a message are arranged in segments, each with its own header, and are assigned message and segment identification. A receiver reconstructs the data message segment by segment and, in the non-group call situation, transmits an acknowledgement after the receipt of a segment. The receiver comprises a resettable timer which is set on the receipt of an acceptable segment and runs for a pre-determined duration. If another segment is received within the duration of the timer and has the same identification as the acceptable segment, then it is treated as a retransmission. Efficiency of the data communication method can be increased by retransmitted data code words being included with new data code words in a segment rather than being transmitted in a separate segment requiring its own header. Optionally, an efficient form of bit interleaving may be used.

10 Claims, 1 Drawing Sheet

METHOD OF DATA COMMUNICATION

This is a continuation of application Ser. No. 904,073, filed Sep. 4, 1986, now abandoned.

FIELD OF THE INVENTION

The present invention relates to a method of data communication, which has particular, but not exclusive, application in mobile data communication systems.

BACKGROUND OF THE INVENTION

A problem which occurs in data communication is corruption due to, for example, channel noise, resulting in the loss of part or all of the message data. Two transmission protocols for use with mobile data systems are disclosed in a paper "Predicting the range and throughput of mobile data systems" by P. J. Mabey reported in the IEEE Vehicular Technology Conference, May 1982, San Diego, USA, pages 370 to 374. Before discussing these protocols reference will be made to FIG. 1 of the accompanying drawings which shows a typical data format. The format begins with a preamble PR of 16 bit-reversals 1010...10 to enable bit synchronization in a data demodulator. The preamble is followed by a 16-bit synchronization sequence SYN to enable code word framing. This is followed by the information which is transmitted in 64-bit code words based on a cyclic error detecting and/or correcting code, each code word containing 48 information bits and 16 error-check bits. The first code word ACW of the message contains addressing information and some data, and is sufficient for short message applications such as status reporting and precoded messages. For longer data messages additional code words DCW1 to DCWn are concatenated onto the first code word ACW as required to accommodate data.

The first retransmission protocol described in the above mentioned paper is termed a simple retransmission protocol. Essentially in this protocol the sending equipment transmits the entire message and then waits for an acknowledgement from the receiving equipment. If no acknowledgement is received or if a retransmission is requested, the sending equipment retransmits the entire message and again waits for an acknowledgement. The message may be retransmitted up to a predetermined maximum number of times, after which if no acknowledgement has been received, the transaction is terminated. For each transmission the receiving equipment must successfully decode the synchronization word SYN and address code word ACW before it can decode the data code words DCW. Decodable data words may be stored and undecodable data words are discarded. The receiving equipment uses data words from the retransmissions, if necessary, to complete the message and the receiving equipment transmits a transaction completion acknowledgement only when it has assembled the whole message (or receives a repeat of a message it has previously completed, because its previous acknowledgement was not decoded or was delayed). Because each retransmission comprises the entire message this simple retransmission protocol can lead to a low throughput. Furthermore it is not suitable for group calls where the receiving equipment does not send acknowledgement signals.

The second of the known retransmission protocols is termed selective retransmission protocol. It enables a higher throughput by avoiding retransmission of data code words already decoded successfully. In this second protocol the receiving equipment transmits an acknowledgement to every transmission that it receives to specify which data code words must be retransmitted, thus improving throughput. In the event of an acknowledgement not being received successfully, the sending equipment repeats its previous transmission. The transaction is complete when an acknowledgement is received which indicates that the receiving equipment has assembled the whole message, or when the sending equipment has made the predetermined maximum number of transmissions. This second protocol also relies on acknowledgements being sent by the receiving equipment which makes it unsuitable for group calls.

Additional problems which arise with retransmission protocols are "duplication" of messages at the receiving equipment when retransmissions are made, the "omission" of messages at the receiving equipment due to corruption in transmission, and "lost" messages due to a sender interpreting an acknowledgement for the wrong message because, for example, the acknowledgement was late. These problems are overcome in line protocols, known per se, by numbering schemes. However, line protocols have the disadvantage of signalling overheads for call establishment or call initalization. Also they are not optimised for group calls.

It is known that efficiency can be improved by transmitting data as a series of segments but, as far as is known, such protocols require a call establishment phase which is an undesirable overhead, particularly for small amounts of data.

An object of the present invention is to overcome these disadvantages when communicating data and provide a more efficient and flexible system.

SUMMARY OF THE INVENTION

According to the present invention there is provided a method of communicating data in which each message comprises one or more segments, the segment or segments being assigned message and segment identification.

In the case of a short message, for example less than 30 source data code words, it may be treated as a single segment.

When implementing the method in accordance with the present invention, it may be arranged that all the segments transmitted contain their respective segment identification and at least the first segment of a long message, or the only segment of a short message including its message identification.

In order to avoid the risk of treating the retransmission of the same segment as a new message, the receiving equipment may include a resettable timer which, when started by the receipt of a segment, runs for a duration which is fixed or may be determined dynamically with respect to the length of the segment. If another segment having the same segment identification is received and if message identification is also present within said duration, the receiving equipment may treat it as a retransmission of a previous segment. However, the receipt of such a segment after the expiration of said duration may be treated as a new segment. The timer may be reset on the receipt of every segment or, alternatively on the receipt of each new segment.

If desired, the data code words may be transmitted by optional bit interleaving and, on receipt, be de-interleaving in a complementary manner. The decision as to whether to bit interleave the data code words or not may be made dynamically and may depend on several factors including, for example, the capabilities of the decoder at the receiving equipment and the prevailing channel conditions. An advantage of using bit interleaving is that if a burst of errors occurs during transmission, the errors are dispersed among several code words, thus increasing the likelihood of the code being able to correct the errors. Consequently the number of segments which need to be retransmitted is reduced. However, under some circumstances bit interleaving can be detrimental, hence the benefit of making bit interleaving optional. If the data code words are bit interleaved, an indication, for example a flag, may be included in the message to indicate to the receiving equipment that the data code words have been interleaved. The degree of interleaving may be dependent on the segment length because the number of code words in a segment may vary. Irrespective of the number of code words in a segment, they can all be interleaved. By making the interleaving degree variable, that is dependent on segment length, the maximum benefit of bit interleaving is gained.

The message data may be encrypted. In which case an indication, for example a flag, may be included in the message to indicate to the receiving equipment that the message data has been encrypted. The need for encryption may depend on the nature of the message data itself and/or the selected address to which it is being sent. Both bit interleaving and encryption may be used together.

The efficiency of the data message protocol can be increased by a segment comprising data code words which are to be retransmitted together with new data code words concatenated onto the words to be retransmitted. This avoids having to transmit a short segment with its associated header for the retransmitted data code words alone.

The present invention will now be described, by way of example, with reference to FIGS. 2 to 5 of the accompanying drawings, wherein:

DESCRIPTION OF THE PREFERRED EMBODIMENT

The method of transmitting message data in accordance with the present invention involves arranging concatenated data code words into a number of segments and each segment is sent in turn. Message and segment identification schemes, for example the use of consecutive numbers, are used to recognize duplicate messages at the receiving equipment. The message data is sent segment by segment. This permits the transaction to be aborted early if the channel is poor and allows the first part of a message to be delivered to its destination before the whole transaction has been completed. Additionally, segmenting also improves throughput and reduces the delays by reducing the amount of repetition.

In formatting the message, each segment contains a preamble, a synchronization sequence and an address code word ACW followed by a plurality of data code words DCW. Typically the number of data code words lies between 1 and 31. The message and segment identification numbers are included in each segment, for example in the first data code word following the address code word.

Figure 1:
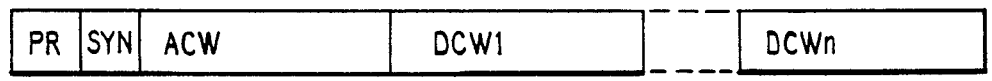
FIG. 1 illustrates the previously discussed data format.
Figure 2:
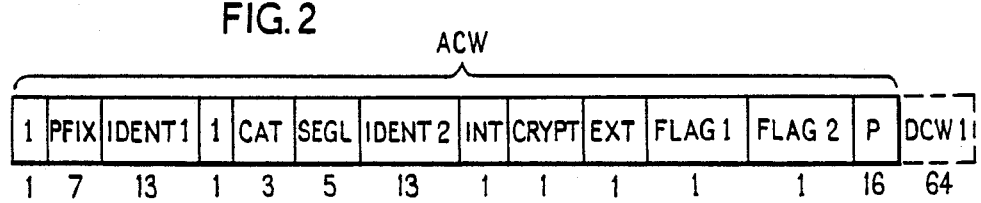
FIG. 2 illustrates the format of an address code word ACW which forms part of the header of a segment.
Figure 3:
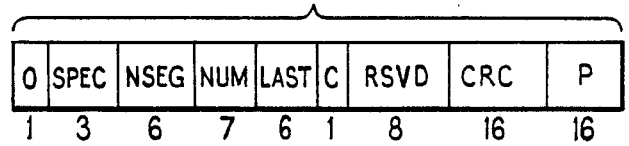
FIG. 3 illustrates the format of the first data code word DCW 1 of a segment.

The format of a 64 bit address code word ACW of a segment is shown in FIG. 2 and the format of the first data code word DCW 1 is shown in FIG. 3. The number of bits used by each part of the address code word and first data code word DCW1 are also indicated. Referring to the address code word ACW in FIG. 2, the first bit is used to indicate if the code word is an address code word (binary digit "1") or a data code word (binary digit "0"). PFIX is an address prefix. IDENT 1 is the address of the receiving equipment or group of receiving equipments. CAT indicates that this address code word is of the category used for message data transmission. SEGL is an indication of the number of concatenated data code words following the address code word. As five bits have been allocated in SEGL then the maximum number is 31 unless encoding of these digits is carried out. IDENT 2 is the address of the sending equipment. INT has a value "0" if the data code words are not interleaved and a value "1" if they are interleaved. CRYPT has a value "0" if data code words are not encrypted and a value "1" if they are encrypted. The last field or part P comprises parity check bits for error correction or detection. The non-described parts EXT, FLAG 1 and FLAG 2 are of no interest insofar as understanding the present invention is concerned.

In FIG. 3 the first bit of the first data code word DCW 1 is "0" indicating that it is a data code word. SPEC is available to indicate for example a specific type of data or data construction, or direct the data to a specified peripheral address. NSEG denotes the segment number. NUM indicates the message number or the number of repeated code words in the segment. More particularly if NSEG=0 indicating a first segment of a message, then NUM=NMESS; if NSEG does not equal 0, then NUM=NREP, where NMESS is the message number and NREP is the number of repeated code words in the segment. NREP is set to zero for non-selective transmissions. LAST is zero for all except the last segment of the message. Within the final code word of the segment LAST denotes the number of data bits used in the code word. If C=1 then the CRC field contains a 16 bit checksum conforming to CCITT Recommendation V24. Alternatively, if C has a value "0" the data is not protected by a checksum contained in the CRC field in which case this field is available for customization. RSVD are bits which have not been dedicated. Consequently, the final sixteen bits P are parity check bits for the 64 bit code word.

In forming a segment the data code words may be compiled by optional bit interleaving. In optional bit interleaving data code words are read into a two dimension store in a row by row direction and read-out in a column by column direction so that all the first bits are read out, then all the second bits, and so on. This means that if there is a burst of errors in transmission, then the errors are shared among the data code words and at the receiving equipment the likelihood of errors exceeding the error correction capability of the decoder is reduced. Thus, the amount of retransmission may be reduced. The use of optional bit interleaving depends on the likely length of the burst, the number of data code words in the segments to be interleaved and the mode of error correction in the receiving equipment. Additionally, the receiving equipment must be capable of de-interleaving the interleaved data.

If required, the data code words may be encrypted, in which case an indication, for example a flag, is included in the message to indicate to the receiving equipment that the message data has been encrypted. The data code words are optionally bit interleaved before being encrypted.

Figure 4:
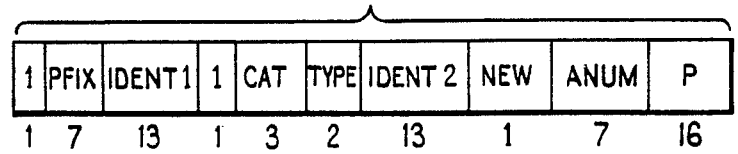
FIG. 4 illustrates the format of an acknowledgement address code word ACKD transmitted by receiving equipment.

FIG. 4 illustrates the address code word of an acknowledgement address code word ACKD to a data segment sent by the receiving equipment to the sending or transmitting equipment. The first bit has a value "1" indicating that the code word is an address code word. PFIX is the address prefix, IDENT 1 is the address of the receiving equipment acknowledging the data segment. CAT indicates that this address code word is of the category used for acknowledgement and TYPE indicates the type of acknowledgement, for example specifying whether the segment has been successfully decoded or whether a selective or non-selective retransmission of the segment is requested. IDENT 2 is the identity of the equipment which has sent the data segment. NEW has a value "0" if a non-zero segment number is being acknowledged and "1" if a segment number zero (that is the first segment of a new message) is being acknowledged. ANUM is the acknowledgement number, if NEW=0 then ANUM=NSEG preceded by a zero and if NEW=1 then ANUM=NMESS in each case (for the segment being acknowledged). P indicates the parity check bits for the 64 bit code word.

Figure 5:
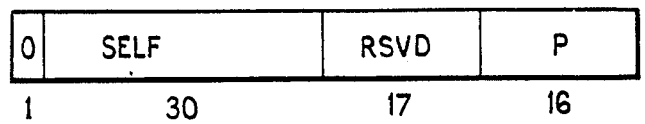
FIG. 5 illustrates the format of the optional data code word following the acknowledgement address code word.

In the case of the acknowledgement address code word requesting a selective retransmission, a control data word, as shown in FIG. 5, follows. The main field of interest is SELF which comprises selective retransmission flags indicating which source data code words of the segment require retransmission. A single bit is allocated to each data code word: "0" indicates that no repeat is required and "1" indicates that the associated data code word is required to be repeated. The most significant bit in the SELF field corresponds to the first transmitted source data code word in the segment. When the segment contains fewer than 30 source data code words, the retransmission information is placed in the most significant bits of the SELF field. The trailing unused bits are set to zero.

The procedures of the protocol will now be described with reference to a call to an individual recipient.

In operation, the sender encodes the source data in a sequence of data code words. There are 47 data bits available in each data code word. If necessary, trailing zeros are added to the source data to complete the final data code word. Messages occupying fewer than 30 source data code words may be sent as a single segment. Longer messages must be subdivided and sent as a number of segments. Each segment may comprise up to 30 source data code words. A header is appended to the beginning of each segment. The header comprises preamble reversals, the code word synchronization sequence SYN, the address code word ACW and the control data code word DCW 1. The fields in the ACW and DCW 1 are set appropriately. The message number NMESS is incremented modulo 128 for each new message that is transmitted, regardless of destination. The segment number NSEG is set to zero at the beginning of each new message and is incremented modulo 64 for each new segment that is transmitted. NSEG is not incremented for an identical repeat transmission.

Optionally the CRC may be calculated and included in the control data code word. The data code words may also be encrypted and/or bit-interleaved. The sender should only interleave by prior arrangement with the recipient. The sender transmits a segment and waits for acknowledgement from the recipient. The TYPE field in the acknowledgement will indicate the meaning of the acknowledgement. For example, whether the segment has been successfully decoded ACKDD or whether a selective retransmission ACKDS or non-selective retransmission ACKDR is requested.

After receiving an acknowledgement the sender will, as appropriate, either retransmit the segment identically, make a selective retransmission, transmit the next segment, consider the call to have been completed successfully, or abort the transaction.

If an acknowledgement is not received the sender may retransmit the segment.

The sender may transmit identical segment repeats up to a predetermined number of times per segment, waiting after each transmission for an acknowledgement.

If a selective retransmission is requested, and the sender is incapable of selective retransmission, then the sender may retransmit the previous segment identically.

If a selective retransmission is being made, the segment number NSEG is incremented. The repeat source data code words are transmitted first in the segment, and then new source data code words may be included, up to a total of 30 source data code words in the segment. In the control data code words DCW 1, NUM=NREP (Number of repeated source data code words).

Thus time can be saved by not devoting an entire segment to the retransmission of selected code words which involves the sending of another header or address code word.

At the receiver, message and segment numbering are used to prevent a segment from being duplicated or enable a receiver to identify when an omission has occurred, and to prevent segments from different messages from being accepted as a single message. The receiver may also check the addresses in the address field IDENT1 and/or IDENT2 if there is a possibility of receiving transmissions not directed to the particular receiver, and/or receiving transmissions directed to the particular receiver but from a different sender.

The timer in the receiver is started every time that a segment is accepted. The timer runs for a period related to the length of a segment. The receiver stores the value of NSEG and the latest accepted NMESS. (NMESS appears in at least the first segment of every message.)

While the time is running, the recipient may accept a segment for which NSEG=0 as starting a new message only if NMESS is different from the previously received NMESS. Otherwise, the segment may be accepted as a repeat of the initial segment of the previous message.

While the timer is running, the recipient may accept a segment as a continuation of the message in progress only if NSEG is incremented by one (mod 64) over its value in the previously accepted segment.

While the timer is running, the recipient may accept a segment as a repeat transmission of a continuation segment only if it has the same segment number (NSEG) as the previously accepted segment.

The final segment of a message is indicated by LAST not being equal to 0.

When the receiver decodes the ACW and DCW 1 of an acceptable segment, that is, a segment satisfying the aforementioned conditions and an applicable individual IDENT1, it shall decode the number of following data code words indicated by SEGL, first decrypting the code words if CRYPT=1 and then de-interleaving the code words if INT=1.

The receiver may require that all of the data code words are decodable before acknowledging with ACKDD, or, provided that the control data code word is decoded successfully, it may store only the decodable source data code words and rely on assembling the remainder by use of repeat transmissions.

The receiver shall send an acknowledgement to each acceptable segment. A non-selective retransmission will be requested by means of ACKDR. A selective retransmission will be requested by means of ACKDS.

In the case of group calls, recipients do not transmit acknowledgements. For group calls the message could be transmitted segment by segment with each segment being retransmitted up to a predetermined number of times before proceeding with the next segment. In any event message and segment numbering is adhered to.

In deciding the duration of the timer period, the duration of the predetermined number of transmissions of a segment. This decision has to take into account the length of a segment must be related, for example an address code word plus thirty-one data code words, and the maximum number of times that the segment may be transmitted, for example eight times.

Message numbering is determined on the basis of an estimation of the maximum number of messages which can be sent in the maximum timer duration, hence if one assumes that 128 (short) messages can be sent in the timer duration, then the numbering sequence should be at least 0 to 127 before it is repeated again. If the number is too small, then in a situation when all the message numbers have been used, no new messages can be sent during the remainder of that period.

We claim:

1. In a data communication system wherein messages comprising data code words are to be transmitted from a data transmitter to one or more of a plurality of data receivers, a method of transmission of such messages comprising the steps of:
    segmenting the data code words of each message into a sequence of successive segments each of a predetermined length;
    assigning an identification number to each message and assigning sequential identification numbers to the successive segments thereof;
    including in the first segment of each message a code word which contains the message identification number and including in the last segment of each message a code word identifying it as the last segment, whereby segments having segment identification numbers between those of the first and last segments of a message are identified as being segments of such message; and
    including in each segment of a message a code word which includes the segment identification number and also indicates whether such segment includes retransmissions of code words which were included in a previously transmitted segment of the same message.

2. The method as claimed in claim 1, further comprising:
    including within a transmitted segment retransmitted data code words and new data code words.

3. The method as claimed in claim 1, wherein:
    at least one segment of each message comprises a header including an address code word and a first data code word containing the message identification number and segment identification number.

4. The method as claimed in claim 1, further comprising:
    transmitting a message by interleaving the bits of the data words thereof; and
    indicating in such message that the data words therein have been bit interleaved.

5. The method as claimed in claim 4, further comprising:
    correlating the degree of bit interleaving with the length of the segments of such message.

6. The method as claimed in claim 1, further comprising:
    encrypting the data words of a message; and
    indicating in the message that the data words thereof have been encrypted.

7. The method as claimed in claim 1, wherein the reception of such messages comprises:
    treating a segment which is received within a predetermined time period following reception of a prior segment having the same segment identification as a repeat transmission of the prior segment; and
    treating as a segment of a new message a received segment having the same identification number as a prior received segment if the subsequent segment is received after the expiration of said predetermined time period.

8. The method as claimed in claim 7, wherein said predetermined time period is related to the length of a received segment.

9. The method as claimed in claim 8, wherein said predetermined time period is further related to a maximum number of times any message segment may be retransmitted.

10. The method as claimed in claim 1 or 7, further comprising transmission by each data receiver of an acknowledgement signal after it receives a message segment; such acknowledgement signal indicating whether the received segment has been decoded successfully, whether retransmission of such segment is needed, and whether retransmission of only specified code words in such segment is needed.

* * * * *

(12) EX PARTE REEXAMINATION CERTIFICATE (7491st)
United States Patent
Mabey et al.

(10) Number: US 4,975,952 C1
(45) Certificate Issued: May 11, 2010

(54) METHOD OF DATA COMMUNICATION

(75) Inventors: Peter J. Mabey, Comberton (GB); Roman Mervart, Impington (GB)

(73) Assignee: U.S. Philips Corporation, New York, NY (US)

Reexamination Request:
No. 90/010,555, May 26, 2009

Reexamination Certificate for:
Patent No.: 4,975,952
Issued: Dec. 4, 1990
Appl. No.: 07/192,815
Filed: May 11, 1988

Related U.S. Application Data

(63) Continuation of application No. 06/904,073, filed on Sep. 4, 1986, now abandoned.

(30) Foreign Application Priority Data

Sep. 4, 1985 (GB) .............................. 8522000

(51) Int. Cl.
*H04L 1/16* (2006.01)
*H04L 1/00* (2006.01)
*H04L 1/18* (2006.01)

(52) U.S. Cl. .................. 713/160; 340/7.43; 370/473; 713/150

(58) Field of Classification Search .................. None
See application file for complete search history.

(56) References Cited

U.S. PATENT DOCUMENTS

| 3,207,851 A | 9/1965 | Fukinuki |
| 3,381,272 A | 4/1968 | Pasini |
| 3,528,057 A | 9/1970 | Van Duuren et al. |
| 3,680,053 A | 7/1972 | Cotton et al. |
| 3,876,979 A | 4/1975 | Winn et al. |
| 3,934,224 A | 1/1976 | Dulaney et al. |
| 3,956,589 A | 5/1976 | Weathers et al. |
| 3,979,719 A | 9/1976 | Tooley et al. |
| 4,058,672 A | 11/1977 | Crager et al. |
| 4,092,630 A | 5/1978 | Van Duuren et al. |
| 4,144,522 A | 3/1979 | Kageyama et al. |
| 4,149,142 A | 4/1979 | Kageyama et al. |
| 4,156,867 A | 5/1979 | Bench et al. |
| 4,249,180 A | 2/1981 | Eberle et al. |
| 4,322,576 A | 3/1982 | Miller |

(Continued)

FOREIGN PATENT DOCUMENTS

| DE | 2522166 | 11/1976 |
| EP | 0089831 | 9/1983 |
| JP | 61-35844 | 2/1986 |

OTHER PUBLICATIONS

"ARQ Schemes for Data Transmission in Mobile Radio Systems," IEEE—Transactions of Vehicular Techonology, vol. VT–33, No. 3, 1984—Comroe and Costello, Jr.

(Continued)

*Primary Examiner*—Woo H. Choi

(57) ABSTRACT

A method of data communication, particularly for long data messages, is disclosed. The data code words of a message are arranged in segments, each with its own header, and are assigned message and segment identification. A receiver reconstructs the data message segment by segment and, in the non-group call situation, transmits an acknowledgement after the receipt of a segment. The receiver comprises a resettable timer which is set on the receipt of an acceptable segment and runs for a pre-determined duration. If another segment is received within the duration of the timer and has the same identification as the acceptable segment, then it is treated as a retransmission. Efficiency of the data communication method can be increased by retransmitted data code words being included with new data code words in a segment rather than being transmitted in a separate segment requiring its own header. Optionally, an efficient form of bit interleaving may be used.

U.S. PATENT DOCUMENTS

| | | | |
|---|---|---|---|
| 4,369,443 | A | 1/1983 | Giallanza et al. |
| 4,394,642 | A | 7/1983 | Currie et al. |
| 4,422,171 | A | 12/1983 | Wortley et al. |
| 4,434,323 | A | 2/1984 | Levine et al. |
| 4,439,859 | A | 3/1984 | Donnan |
| 4,449,248 | A | 5/1984 | Leslie et al. |
| 4,517,669 | A | 5/1985 | Freeburg et al. |
| 4,519,068 | A | 5/1985 | Krebs et al. |
| 4,536,791 | A | 8/1985 | Campbell et al. |
| 4,551,834 | A | 11/1985 | Lienard |
| 4,618,955 | A | 10/1986 | Sharpe et al. |
| 4,636,851 | A | 1/1987 | Drury et al. |
| 4,661,657 | A | 4/1987 | Grenzebach et al. |
| 4,672,608 | A | 6/1987 | Ball et al. |
| 4,694,489 | A | 9/1987 | Frederiksen |
| 4,700,388 | A | 10/1987 | Okada et al. |
| 4,757,536 | A | 7/1988 | Szczutkowski et al. |
| 4,897,783 | A | 1/1990 | Nay |
| 4,899,306 | A | 2/1990 | Greer |
| 4,922,415 | A | 5/1990 | Hemdal |
| 4,931,922 | A | 6/1990 | Baty et al. |
| 4,935,870 | A | 6/1990 | Burk et al. |

OTHER PUBLICATIONS

Automatic Repeat–Request Error–Control Schemes—IEEE Communications Magazine—Dec. 1984—vol. 22, No. 12, pp. 5–17—Lin, Costello, Jr. and Miller.

"Coding for Two–Way Channels" In the Fourth Sondon Symposium on Information Theory, London, England—Sep. 1960—p. 11—Wozencraft et al.

"Computer Networks" Andrew S. Tanenbaum—Prentice–Hall, Inc.—1981—All pages.

"Design Issues of Protocols for Computer Mail"—1981—pp. 28–32—by Jose J. Garcia–Luna–Aceves and Franklin F. Kuo—Dept. of Electrical Engineering—University of Hawaii at Manoa, Hololulu, Hawaii.

"Efficient Computer–Computer Communications" Proceedings of the IEEE, Aug. 1976, vol. 123, No. 8—Field.

"Error Control Coding" 1983 by Prentice–Hall, Inc., Englewood Cliffs, NJ 07632—pp. 271–272, 459–461—Lin & Costello—Illinois Institute of Technology.

"High Speed Data Transfer Over Satellites" Compcon 83 Proceedings—1983—pp. 66–70—Owings.

"Improvements in Block–Retransmission Schemes" IEEE Transactions on Communications, vol. 27, No. 2—Feb. 1979—pp. 524–532—Metzner.

"Predicting the Range and Throughput of Mobile Data Systems" IEEE Vehicular Technology Conference—May 1982—pp. 370–374—Mabey.

"Secure Communication Using Remote Procedure Calls," ACM Transactions on Computer Systems, vol. 3, No. 1, Feb. 1985 pp. 1–14—Andrew D. Birrell.

"The Application of Digital Broadcase Communication to Large Scale Information Systems" IEEE J. on Selected Areas on Communications, vol. SAC–3, No. 3—Gifford et al.

IBM Tech. Discl. Bull., vol. 24, No. 11B—Apr. 1982—pp. 5805–5808.

RFC: 791 Internet Protocol: DARPA Internet Program Protocol Specification—Sep. 1981—All pages—Information Sciences Institute.

The Institute of Electrical and Electronic Engineers, IEEE Std 802.11 2007, ISBN 0738156566 SS95708, New York, New York.

Wikipedia, http://en.wikipedia.org/wiki/OSI_model, (Last viewed May 26, 2009).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 6 is confirmed.

Claims 2–5 and 7–10 were not reexamined.

* * * * *